April 1, 1941.　　　　J. G. CHAFFEE　　　　2,236,893
RADIANT ENERGY DISTANCE DETERMINING SYSTEM
Filed Dec. 30, 1939　　　2 Sheets-Sheet 1
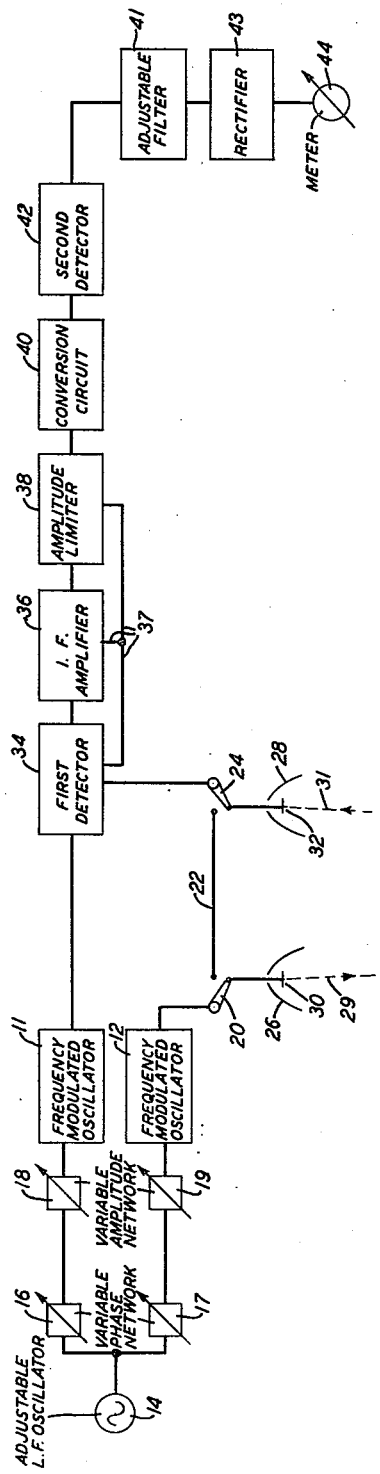
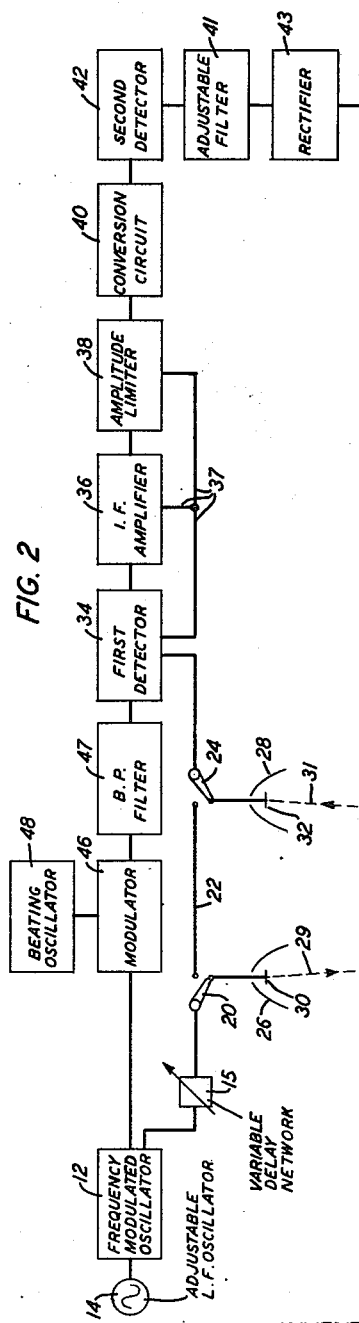
INVENTOR
J. G. CHAFFEE
BY
H. O. Wright
ATTORNEY April 1, 1941.  J. G. CHAFFEE  2,236,893
RADIANT ENERGY DISTANCE DETERMINING SYSTEM
Filed Dec. 30, 1939  2 Sheets—Sheet 2
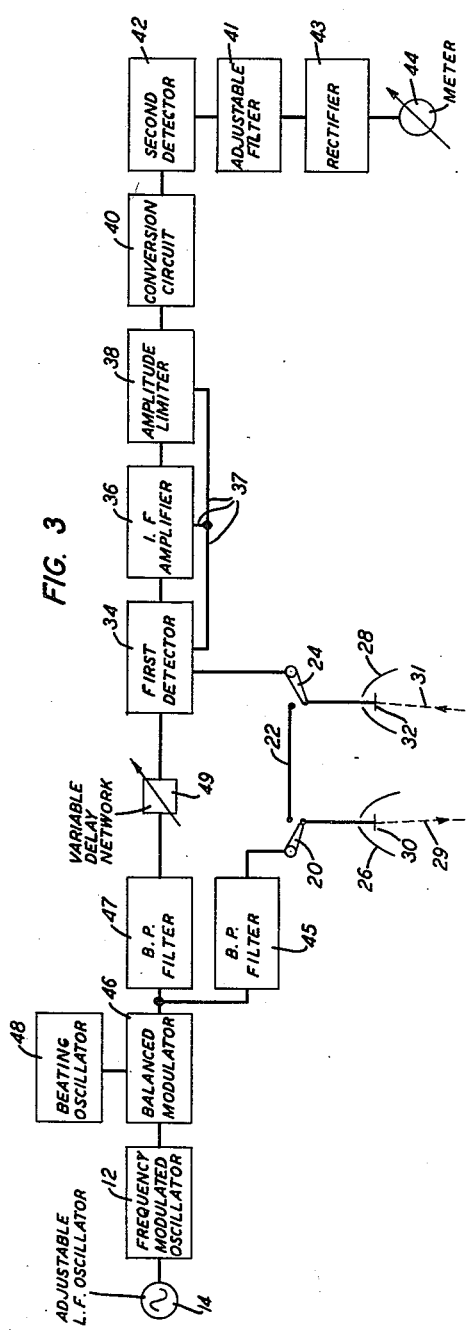
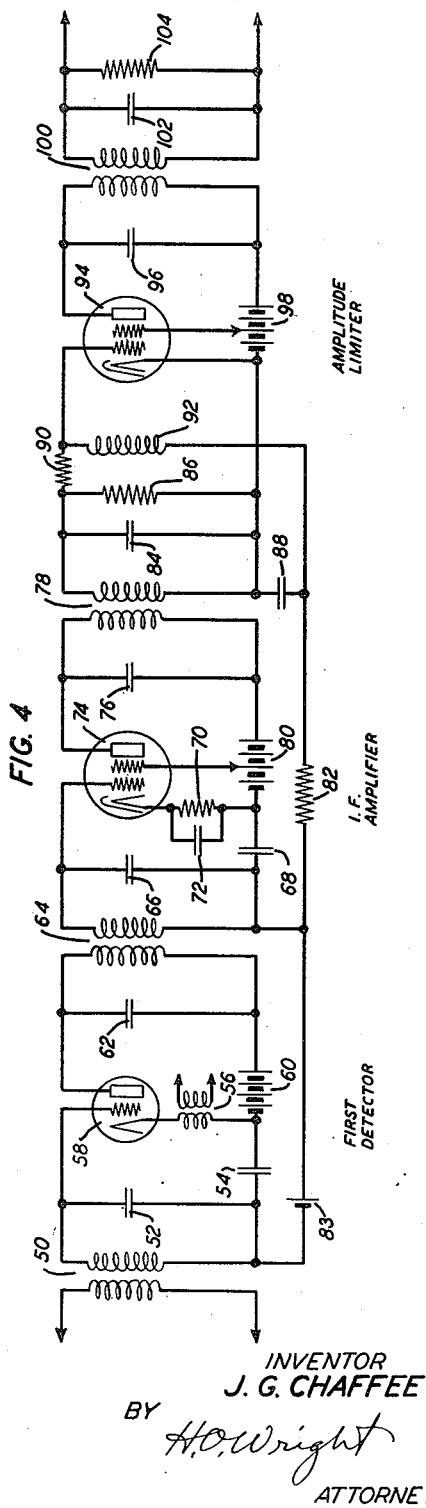
INVENTOR
J. G. CHAFFEE
BY H. O. Wright
ATTORNEY

UNITED STATES PATENT OFFICE 2,236,893

RADIANT ENERGY DISTANCE DETERMINING SYSTEM

Joseph G. Chaffee, Hackensack, N. J., assignor to Bell Telephone Laboratories, Incorporated, New York, N. Y., a corporation of New York Application December 30, 1939, Serial No. 311,723

11 Claims. (Cl. 250—1)

This invention relates to an improved form of radiant energy distance determining system of the type which employs an exploratory wave, preferably a radio wave, the frequency of which is continuously varied between prescribed limits.

The illustrative embodiments to be described in detail hereinafter are radio systems and apply the principles of the invention to the determination of the clearance of aircraft with respect to adjacent objects, particularly the surface of the earth above which the craft is proceeding.

It is taught in the prior art, as for example in United States Patents 2,045,071 and 2,045,072, issued June 23, 1936, to L. Espenschied, that the distance to a reflecting surface may be determined by directing toward the surface an exploratory wave the frequency of which is continuously being varied between prescribed limits, receiving reflections of the wave from the surface, beating the received reflected waves with energy directly received from the source of transmitted waves and determining the frequency of the beat note thus produced to obtain an indication of the distance to the reflecting surface. Where, as is normally required, a relatively wide range of distances is to be measured without readjustments of the parameters of the system the arrangements of the prior art usually result in an inconveniently wide range of frequencies between the maximum and the minimum beat note frequencies. For example, in some systems of this type beat frequencies ranging between 50 and 150,000 cycles per second are produced. In reducing such systems to practice it has been found difficult to provide amplifying systems which will maintain the requisite properties with sufficient uniformity and gain over such a range of frequencies.

To avoid this and a number of other difficulties, the systems of the present invention, as will appear in more detail hereinafter, provide for heterodyning the received reflected component of the exploratory frequency modulated wave with a second wave of suitable frequency to produce a convenient intermediate frequency wave, the second wave being frequency modulated in synchronism with and to the same extent as the exploratory wave being sent out. Within limits, which will be set out hereinafter, this will result in frequency modulation of the intermediate wave, the extent of which will be directly proportional to the distance to be measured.

The method of the invention includes the further step of amplitude limiting the frequency modulated intermediate frequency wave to effectively eliminate casual amplitude variations and thereby producing a distance indicating wave the sole significant characteristic of which is the extent to which it is frequency modulated. The systems of the invention will therefore, obviously, be independent of variations in amplitude such, for example, as those resulting from changes in altitude.

Accordingly, outstanding among the objects of the invention is the provision of altimeter systems in which appropriate amplification of the reflected exploratory wave may be conveniently achieved.

Another object is the provision of an altimeter system in which very effective discrimination against noise interference may be readily provided.

Another object is the provision of an altimeter system in which a single reliable characteristic of the distance indicating wave may be readily isolated and employed to actuate distance indicating means.

A further object is to provide an altimeter system in which the distance indicating characteristic of the distance indicating wave which is employed varies in a substantially linear manner over the range of distances to be observed.

A further object is to provide an altimeter system, employing a frequency modulated exploratory wave, the distance indications of which system are not affected by amplitude variations of the reflected exploratory wave.

Another object is the provision of a radio altimeter system in which the operating range may be conveniently changed.

Other objects will become apparent during the course of the following description and in the appended claims.

The principles underlying the present invention may be briefly explained as follows:

If two radio frequency oscillators, differing in mean frequency by such an amount as to yield a suitable intermediate frequency wave when their outputs are impressed upon a detector, are frequency modulated exactly in phase and to an exactly similar extent, upon detection an unmodulated intermediate or difference frequency wave will be obtained exactly as though both oscillators had not been frequency modulated.

However, if the output of one oscillator traverses a path having a different time delay characteristic from the path traversed by the output of the other oscillator and the two outputs are then combined and detected, the resulting intermediate frequency will be found to be frequency modulated also. Moreover, the extent of the resulting modulation of the intermediate frequency wave will depend upon the difference in time delay between the paths traversed by the two oscillator outputs. If the largest time delay difference (corresponding to the maximum distance to be measured) is relatively small, the relationship will be substantially linear over the range of distances to be measured.

The frequency modulated intermediate frequency is amplified, limited in amplitude to an extent sufficient to remove all amplitude variations and impressed upon a conversion circuit. The function of the conversion circuit is to convert the frequency modulated wave into an amplitude modulated wave. A discussion of "The Detection of Frequency Modulated Waves" is given in my article of that title published on pages 517 to 540, inclusive, of the Proceedings of the Institute of Radio Engineers, volume 23, of May, 1935.

The output of the conversion circuit is passed through a second detector and the low frequency signal resulting is supplied to an indicating circuit comprising, in one suitable form, a filter, a linear rectifier, and a direct current meter.

The pass-band of the filter may be made extremely narrow since it need pass only a single frequency, namely, that representing the frequency modulation of the exploratory wave. It may, therefore, afford very effective protection against noise interference, that is, interference resulting from stray or unwanted currents, which arise from a multitude of heterogeneous causes as is well known in the art.

The meter can be calibrated in terms of time delay, or preferably in terms of the distance to the reflecting surface, which is obviously directly related to the difference in the length of the two paths traversed by the two oscillator outputs, prior to their combination in the first detector.

The path of the output of one oscillator, in a system designed for use as a radio altimeter, obviously includes a radio link. That is, one oscillator energizes an antenna the wave from which is directed toward the earth's surface. A component of the wave is received after reflection from the earth's surface and is combined with the output of the other oscillator and detector, etc. as described above.

The metallic paths of the two oscillator outputs are preferably adjusted to be of like electrical characteristics so that the differences obtaining between them at the first detector will result solely from the radio link.

The indicating meter is preferably calibrated so that the distance to the reflecting surface may be read directly in feet.

In balancing the metallic paths, as above mentioned, relative phase and amplitude adjustments can, obviously, be made by changing the relative phase and amplitude, or extent, of the frequency modulation of the two oscillators as an alternative to the method of introducing relay in the output of one of the oscillators.

As a modification, to avoid the necessity of maintaining two radio frequency oscillator frequencies with great precision, a single, frequency-modulated, radio frequency oscillator can be employed and part of its output can be combined in a modulator with a fixed frequency wave having the frequency desired for the intermediate frequency, while the remainder of its output is employed to energize the transmitting antenna. At the output of the modulator one side-band resulting from the modulation process is segregated, by means of an appropriate band-pass filter, from the other products, and is used in place of an independent source of frequency modulated waves.

A further modification of the method of the invention offering still more advantages, as will become apparent hereinafter, comprises employing a single, frequency-modulated, radio frequency oscillator, its output being combined in a modulator with a fixed frequency wave having a particular frequency determined by, but not identical with, the frequency desired for the intermediate frequency. At the output of the modulator, two side-bands resulting from the modulation process and differing substantially in frequency, are segregated by appropriate band-pass filters, and one side-band is employed to energize the transmitting antenna while the other is introduced, through an appropriate phase adjusting means if such is found necessary, into the first detector for combination with reflected components of the transmitted frequency.

The outstanding virtue of such an arrangement is that the resulting intermediate frequency differs from the frequency of the fixed frequency beating oscillator. This results in a reduction of cross-talk difficulties and simplifies the shielding problems. A further advantage is that the metallic paths of the two side-bands selected are more nearly of like character, which facilitates the initial adjustment of the system for zero distance. In fact, if, as may readily be done, the two band-pass filters are designed to have similar delay characteristics it is possible to dispense entirely with the phase adjusting means.

Direct transmission between the transmitting and the receiving antennas should preferably be reduced to a minimum by making them highly directive; spacing them, in so far as it is practicable to do so, to avoid coupling between them and by other similar means, well known to the art. If a sufficient reduction in direct transmission from the transmitting antenna to the receiving antenna cannot be conveniently effected by simpler means, it may be balanced out by the well-known method of feeding some energy of the transmitted frequency directly to the receiver and adjusting the phase and amplitude of this latter energy to balance out the unwanted energy directly received by the receiving antenna.

The conversion circuit is preferably of the conventional balanced type having a substantially linear response over the range of interest for any particular system. Such a circuit is included, for example, in Fig. 5 of my article entitled "The Application of Negative Feedback to Frequency Modulation Systems," published in the Bell System Technical Journal, vol. XVIII, pages 404 to 437, July 1939. Obviously, the feedback circuit should be omitted, and in the systems of this invention the beating oscillator of the above-mentioned Fig. 5 would also not be used. Other forms of conversion circuits are shown, by way of example, in United States Patents 1,715,561, issued June 4, 1929, to F. Mohr, and 1,922,290, issued August 15, 1933, to C. W. Hansell.

An additional reason for employing a balanced conversion circuit is that it will facilitate the application of conventional automatic tuning arrangements to the systems of the invention. Such arrangements are not shown in the appended drawings as it is felt that they might introduce confusion. The application of such arrangements to the systems of the invention is believed to be quite obvious. For example, a tuning control voltage obtained in conventional manner from the balanced conversion circuit can obviously be carried back to either oscillator 11 or 12 of the system of Fig. 1 of the appended drawings. Means for obtaining this frequency control potential are indicated in the aforementioned Fig. 5 of my paper referred to above.

Since a wide range of amplitudes of the reflected signals will normally be obtained where systems of the invention are employed to measure the altitude of aircraft over a wide range of altitudes above the surface of the earth, the incorporation of special features, to be described in detail hereinafter, will be desirable in connection with the amplitude limiting means employed.

The features of the invention will become more apparent in connection with the following detailed description of illustrative embodiments thereof, together with the accompanying drawings in which:

Fig. 1 shows in block schematic diagram form one embodiment of the invention;

Fig. 2 shows in block schematic diagram form a modification of the arrangement of Fig. 1 which requires only one frequency-modulated oscillator;

Fig. 3 shows a further modification in block schematic diagram form of the system of Fig. 1 in connection with which cross-talk, shielding and adjustment problems are simplified; and Fig. 4 shows one form of amplitude limiting means, provided with automatic means to control the amplitude gains introduced by the first detector and the intermediate frequency amplifier, which is of value for use with systems of the invention.

In more detail, in Fig. 1, frequency-modulated oscillators 11 and 12 differ in mean frequency by an amount sufficient to produce a convenient intermediate frequency when their respective outputs are combined and detected.

Low frequency oscillator 14 is employed to frequency modulate both radio frequency oscillators 11 and 12 at a convenient rate. As will be subsequently explained in detail, the frequency of oscillator 14 determines the range of distances over which a linear relation obtains between distance and the indication afforded by the over-all system. Simply by changing the frequency of oscillator 14, therefore, the range of the system may be changed. As will also be brought out below, the pass-band of filter 41 should be adjusted to pass the frequency to which oscillator 14 is adjusted.

Variable phase and amplitude controlling networks 16, 17 and 18, 19 are shown in the circuits connecting oscillator 14 with oscillators 11 and 12, respectively. These devices provide means for insuring an exact correspondence between the frequency variations imparted to oscillators 11 and 12, both with respect to phase and to magnitude. The arrangement indicated is that providing the greatest degree of flexibility. Obviously, if oscillators 11 and 12 have identical modulation characteristics, devices 16 to 19, inclusive, can be dispensed with. Switching means 20 and 24 and transmission line 22 are provided so that the output of oscillator 12 may be connected directly to the detector 34, whereby a zero distance adjustment for the system may be made by adjusting devices 16 to 19, inclusive, until the output of the system falls to zero.

During the operation of the system, switching devices 20 and 24 connect the output of oscillator 12 to transmitting antenna 30 and the input of detector 34 to receiving antenna 32, respectively, as shown in Fig. 1. Reflecting shields 26 and 28 enhance the directive properties of antennas 30 and 32, respectively. The primary purpose of these shields is to reduce direct transmission of energy from antenna 30 to antenna 32. The wave 29 radiated by antenna 30 strikes a reflecting surface (in the case of aircraft altimeters this surface is, of course, the surface of the earth) and a reflection of the wave 29, namely, wave 31, returns to receiving antenna 32, whence it is led to first detector 34 where it is combined with the output of oscillator 11 and an intermediate frequency is produced, as explained above, the extent of the frequency modulation of which is dependent upon the difference in time delay existing between the path followed by the output of oscillator 11 and that followed by the portion of the transmitted wave, represented by reflected wave 31.

The frequency-modulated, intermediate frequency is amplified in intermediate frequency amplifier 36, passed through amplitude limiter 38 and converted to an amplitude modulated signal in conversion circuit 40. The signal thus obtained will have the frequency of oscillator 14 and its amplitude will, within the limits of operation which will be defined hereinafter, be substantially linearly proportional to the altitude or distance being measured by the system.

The amplitude modulated signal thus obtained is passed through second detector 42 and then through filter 41 which eliminates extraneous noises, except for those which perchance fall within the relatively very narrow band required to pass the detected signal frequency of the system. As will be explained in more detail hereinafter the operating range of the system may be changed by simply adjusting oscillator 14 to a different frequency and adjusting filter 41 to pass the new frequency. Since filter 41 is required to pass only a single frequency, namely, the frequency to which oscillator 14 is adjusted, it can discriminate very sharply and effectively against all other frequencies and thus substantially eliminate interference by unwanted, stray, or noise currents. The output of filter 41 is rectified by rectifier 43 and the rectified current is supplied to direct current meter 44 which is calibrated to read altitude, or distance, directly in feet or other convenient units.

In Figs. 1 to 3, inclusive, auxiliary connections 37 between limiter 38, detector 34 and amplifier 36 are indicated. The nature and purpose of these connections will be described below in connection with Fig. 4.

In Fig. 2 a modification of the system of Fig. 1 is shown whereby a single, frequency-modulated, oscillator 12 will suffice.

In this modified system, the signal introduced into first detector 34 for comparison with reflected wave 31 is obtained in modulator 46 by beating a portion of the output of oscillator 12 with the output of a second oscillator 48, having a fixed frequency, to obtain the required heterodyne wave. Modulator 46 is preferably of the balanced type well known in the art. Band-pass filter 47 selects a side-band modulation product for combination in detector 34 with reflected wave 31. It is, of course, evident that the intermediate frequency wave obtained by detection of the combination of this side-band wave and the reflected wave 31 will be of the same mean frequency as that furnished by oscillator 48.

In the system of Fig. 2, modulator 46 and filter 47 introduce a small delay in the path between oscillator 12 and first detector 34. Consequently, with switches 20 and 24 in the horizontal position, the two high frequency waves delivered to the input to first detector 34 will not be modulated in exact synchronism unless a corresponding delay is introduced into the path including switches 20, 24 and conductor 22. This is provided by variable delay network 15 included in the circuit as indicated. This device provides means for obtaining an initial or "zero altitude" balance, and in this respect is analogous to devices 16 to 19, inclusive, in Fig. 1. The remaining parts of the system of Fig. 2 are identical with the correspondingly designated parts of the system of Fig. 1 and consequently need not be described again in detail.

The system of Fig. 3 differs from that of Fig. 2 principally in that for the system of Fig. 3 energy for radiation from antenna 30 is also obtained at the output of modulator 46 through a second band-pass filter 45, designed to select the opposite side-band from that selected by filter 47, that is, by way of example, if filter 47 selects the upper side-band (i. e. $f_1+f_2$, where $f_1$ is the frequency of oscillator 12 and $f_2$ is that of oscillator 48) then filter 45 should select the lower sideband (i. e. $f_1-f_2$) in which case the intermediate frequency resulting from the combination of the output of filter 47 with the reflected wave in first detector 34 will be $2f_2$, where $f_2$ is (as above assumed) the frequency of oscillator 48. This is desirable since it reduces cross-talk and shielding problems which may arise in systems of the type illustrated by Fig. 2 in which oscillator 48 has the same frequency as the mean value of the intermediate frequency of amplifier 36. One or more variable delay networks, such as 49, may be introduced, if necessary, to obtain a balance of the circuit branches for the zero altitude, or distance, condition as described in connection with the systems of Figs. 1 and 2. The system of Fig. 3 can, however, conveniently be designed to provide substantially identical metallic paths for the two frequencies of the system and at most only minor adjustment of the system should therefore be required.

The signal which is observed, to obtain an indication of the distance to the reflecting surface, for all systems of this invention has, at the output of the second detector, a frequency equal to that of the oscillator 14 of Figs. 1, 2 and 3 and an amplitude which is determined by the extent to which the intermediate frequency wave is frequency modulated, under any given set of conditions. If the aircraft carrying the system is on the ground the delay of the radio link is substantially zero, and, assuming that the phase characteristics of the metallic circuits are identical, the intermediate frequency wave will be of constant frequency. Consequently, the output of the receiver will be zero. As the aircraft rises in the air, delay proportional to altitude will be introduced into the radio link and the intermediate wave will, therefore, be frequency modulated to a degree which will depend upon the delay.

The relationship between the effective modulation for the system and the distance of the aircraft above the reflecting surface is as follows:

$$\Delta\omega' = \Delta\omega\left[2 \sin \frac{2\pi f_m h}{c}\right] \qquad (1)$$

where $\Delta\omega$ = maximum frequency shift imparted to the transmitted wave.

$\Delta\omega'$ = maximum frequency shift experienced by the intermediate frequency wave.

$f_m$ = signal frequency, that is, the frequency generated by the oscillator 14, of Figs. 1, 2 and 3.

$h$ = altitude of plane in meters.

$c$ = velocity of propagation of radio waves in meters per second.

The argument of the sine function in the above expression is numerically equal to one half of the phase delay experienced by the signal. If this quantity is less than about 0.1 radian the above equation becomes very closely $$\Delta\omega' = \Delta\omega \frac{4\pi f_m h}{c} \qquad (2)$$

so that the amplitude of the received signal is closely proportional to the altitude of the plane. If the output indicating means is made to have a linear response in terms of detected signal amplitude it will likewise indicate altitude in linear fashion.

If, for instance, a signal frequency, $f_m$, of 1,000 cycles is employed the response will be essentially linear for altitudes from zero to about 2390 meters, or approximately 7850 feet which range is adequate for the navigation of most commercial aircraft while cruising. If this frequency is increased to 10,000 cycles the corresponding range will extend from zero to about 239 meters or 785 feet which range is convenient for use while landing or taking off. In either case the product of $f_m$ and $h$ is the same at the upper altitude limit given, so that equal values of $\Delta\omega'$, and hence similar meter readings, will be obtained. It is thus seen, for example, that by altering the frequency of oscillator 14, of Figs. 1, 2 and 3, the sensitivity and range of the altimeter can be readily altered to suit the requirements of the moment. For this reason oscillator 14 is normally provided with one of the numerous means well known to the art for adjusting its frequency to any one of several appropriate values. Since greatest freedom from noise is realized by making the pass-band of filter 41 very narrow it is advantageous to provide it also with one of the likewise numerous means well known to the art, for adjusting its pass-band to pass only the particular frequency to which oscillator 14 has been adjusted. For convenience the frequency adjusting means of the filter should be mechanically coupled with that of the oscillator so that the appropriate pass-band of filter 41 is selected simultaneously upon adjusting oscillator 14 to any particular frequency. Multiple scales are also preferably provided on meter 44, one scale corresponding to each of the ranges which may be selected by the above-described frequency selection.

Fig. 4 is illustrative of a convenient method for insuring that adequate amplitude limitation of the intermediate frequency signals will be obtained over the wide range of reflected wave intensities which are experienced. In Fig. 4 it will be assumed for purposes of illustration that vacuum tube 58 is the first detector tube, vacuum tube 74 is the intermediate frequency amplifier tube and vacuum tube 94 is the amplitude limiter tube. Vacuum tube 94 is operated at reduced plate and screen potentials so that it is readily overloaded by the intermediate frequency wave applied to its grid. The associated circuits coupling these tubes together and to associated pieces of apparatus are conventional except for the circuit containing resistance 90, potential source 83, condenser 88 and coil 92. By virtue of this circuit the rectified voltage developed across resistor 90 in the control grid circuit of amplitude limiter tube 94 is impressed upon the control grid circuits of first detector tube 58 and amplifier tube 74 as shown. The arrangement shown has the effect of reducing the wide variation in the values of intermediate frequency voltage which would ordinarily be delivered to the limiter during normal operation, and constitutes a form of automatic gain control for the combination of first detector and amplifier whereby the implitude of the intermediate frequency wave reaching the conversion circuit 40 can more readily be made substantially independent of the amplitude of the signals introduced into the first detector. This is, as has been pointed out above, necessary to insure the satisfactory operation of systems of the invention over the wide ranges of amplitude of the received reflected wave encountered in practicing the invention over wide altitude ranges.

Numerous applications of the principles of the invention will occur to those skilled in the art. The above-described embodiments are merely illustrative of the application of said principles.

The scope of the invention is defined in the following claims.

What is claimed is:

1. The method of determining the distance between an object and a reflecting surface which comprises the steps of generating on said object a radio frequency carrier wave modulated in frequency at a relatively low frequency rate, directively radiating the modulated wave so that it is reflected back to said object from said surface, receiving the reflected wave on said object, producing on said object a heterodyne wave modulated in frequency synchronously with and to the same degree as the radiated wave, combining the received reflected wave with the heterodyne wave to produce a different frequency wave, and utilizing the frequency variation of the said difference frequency wave to obtain an indication of the distance between said object and said surface.

2. The method in accordance with claim 1, the heterodyne wave being produced by modulating a portion of the generated carrier wave with a wave of fixed frequency intermediate the mean carrier frequency and the modulation frequency, and selecting a modulation product different in its mean frequency from the generated carrier.

3. In a radio range finding system of the type in which the distance of a remote object is determined by radiating a frequency modulated wave towards the object, receiving a wave reflected therefrom, and determining the phase difference of the modulation of the transmitted and received waves, the method of operation which comprises producing a heterodyne wave differing in its mean frequency from the radiated wave and modulated in frequency synchronously with and to the same degree as the radiated wave, beating the received wave with the heterodyne wave to produce a different frequency wave, and utilizing the frequency variation of the said difference frequency wave to indicate the distance of the remote object.

4. An altimeter for aircraft comprising on said craft, means for generating two radio frequency waves of frequency difference equal to an intermediate frequency, means for synchronously modulating to equal degrees both of said radio frequency waves by a particular low frequency, means for radiating one of said radio frequency waves toward the surface of the earth beneath said aircraft, means for receiving reflections of said radiated wave, means for combining said received reflected wave with the other said radio frequency wave and detecting the combination to obtain a frequency modulated intermediate frequency wave, means for amplifying and amplitude limiting said intermediate frequency wave, and means for converting said frequency modulated intermediate frequency wave to an amplitude modulated wave and means for determining the extent of the modulation of said intermediate frequency wave whereby an indication of the distance between said craft and the surface of the earth beneath it is obtained.

5. An altimeter for aircraft as defined in claim 4, said means for determining the extent of the modulation of said intermediate frequency wave, including a frequency to amplitude modulation converter, a second detector, a filter, a rectifier and a direct current meter.

6. An altimeter for aircraft as defined in claim 4, the said first-mentioned detecting means, the said intermediate frequency amplifying means and the said amplitude limiting means each including a thermionic vacuum tube device having a control grid circuit, and means for impressing upon the control grid circuits of said first-mentioned detecting means and said intermediate frequency amplifying means a rectified voltage developed in the control grid circuit of said amplitude limiting means whereby the range of altitudes measurable by said altimeter is extended.

7. The method of determining the distance from an object to a reflecting surface which comprises generating on said object a radio frequency wave modulated in frequency at a relatively low rate, beating said wave with a fixed frequency equal to half the frequency of a desirable intermediate frequency wave, severally selecting an upper and a corresponding lower second order side-band frequency product from the resulting modulation products, directively radiating one of the selected side-band frequency waves so that it is reflected back to said object from said surface, receiving the reflected wave on said object, combining the received reflected wave with the other selected side-band frequency wave to produce a difference frequency wave, and utilizing the frequency variation of the said difference frequency wave to obtain an indication of the distance between said object and said surface.

8. In a radio altimeter for aircraft, means for generating a radio frequency wave, means for frequency modulating said wave at a relatively low rate, means for generating a second wave having a frequency half that of a convenient intermediate frequency wave, means for beating said first wave with said second wave, means for severally selecting the upper and lower side-band frequencies of a particular order of the resulting modulation products, means for radiating one of said side-band frequency waves so selected toward the surface of the earth, means for receiving reflections of said wave on said craft, means for combining said reflected wave with the other of said selected side-band frequency waves to obtain a difference frequency wave, and means for determining the extent of the frequency modulation of said difference frequency wave to obtain an indication of the distance of said craft above the surface of the earth.

9. The altimeter of claim 8 and means for changing the frequency of the modulation of the first said radio frequency wave to effect an appropriate change of satisfactory operating range for said altimeter.

10. An altimeter for aircraft comprising on said craft a first means for generating a radio frequency wave, a second means for frequency modulating the said radio frequency wave at a relatively low frequency rate, a third means for modulating the resulting frequency modulated radio frequency wave with a wave of fixed frequency intermediate the frequencies of said first and said second-stated means, means for selecting from the products resulting from the operation of the third-stated means an upper side-band frequency wave and a lower side-band frequency wave of like order of modulation, means for radiating one of said side-band frequency waves to strike the earth beneath said craft, means for receiving reflections from the earth of said radiated side-band frequency wave, means for combining the received reflected waves with the said other side-band frequency wave and detecting the combined side-band waves to obtain a frequency modulated, intermediate frequency wave, means for amplitude limiting the resulting frequency modulated, intermediate frequency wave and converting its frequency modulation into amplitude modulation, means for detecting the resulting amplitude modulation, means for selecting from the products produced by the said second detecting means the frequency of the above said second means for modulating at a low frequency rate, said last-stated selective means excluding substantially all other frequencies and means for indicating the amplitude of said selected frequency including means for rectifying the selected frequency and means for indicating the magnitude of the resulting rectified current.

11. An altimeter for aircraft as in claim 10 the said second means being adjustable to function at any one of a plurality of low frequencies and the last-stated selective means being adjustable to severally select any one of the said plurality of low frequencies and to substantially exclude all other frequencies.

JOSEPH G. CHAFFEE.